United States Patent
Yang et al.

(10) Patent No.: US 8,883,117 B2
(45) Date of Patent: Nov. 11, 2014

(54) METHOD OF ENHANCING THERMAL CONDUCTIVITY IN HYDROGEN STORAGE SYSTEMS

(71) Applicant: Ford Global Technologies, LLC, Dearborn, MI (US)

(72) Inventors: Jun Yang, Ann Arbor, MI (US); Donald J. Siegel, Ann Arbor, MI (US); Andrea Sudik, Plymouth, MI (US); Andrew Robert Drews, Ann Arbor, MI (US); Shinichi Hirano, West Bloomfield, MI (US); Christopher Mark Wolverton, Evanston, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/850,412

(22) Filed: Mar. 26, 2013

(65) Prior Publication Data
US 2013/0209354 A1    Aug. 15, 2013

Related U.S. Application Data

(63) Continuation of application No. 12/780,445, filed on May 14, 2010, now Pat. No. 8,418,841.

(51) Int. Cl.
| | | |
|---|---|---|
| *B01J 7/00* | (2006.01) | |
| *C01B 3/04* | (2006.01) | |
| *C01B 6/24* | (2006.01) | |
| *C01B 3/00* | (2006.01) | |

(52) U.S. Cl.
CPC .............. *C01B 3/0078* (2013.01); *Y02E 60/327* (2013.01); *C01B 3/001* (2013.01); *C01B 3/0026* (2013.01)
USPC .......................... 423/648.1; 206/0.7; 423/644

(58) Field of Classification Search
USPC .................. 206/0.7; 423/644–658.3; 420/900
See application file for complete search history.

(56) References Cited

U.S. PATENT DOCUMENTS

| | | | |
|---|---|---|---|
| 6,106,801 A | 8/2000 | Bogdanovic et al. | |
| 8,147,796 B2 * | 4/2012 | Lu et al. | 423/646 |

(Continued)

OTHER PUBLICATIONS

Xiong et al. Thermodynamic and kinetic investigations of the hydrogen storage in the Li—Mg—N—H system, 2005, Journal of Alloys and Compounds 398, p. 235-239.*

(Continued)

*Primary Examiner* — Stanley Silverman
*Assistant Examiner* — Syed Iqbal
(74) *Attorney, Agent, or Firm* — Damian Porcari; Brooks Kushman P.C.

(57) ABSTRACT

A method of forming a material for reversible hydrogen storage within a storage tank includes charging a mixture of a metal amide and a metal hydride to the storage tank, and chemically reacting the mixture at a reaction condition within the storage tank to form a thermally conducting composite material situated in the storage tank and for reversibly storing hydrogen. The composite material includes a three-dimensional and interconnected framework including a conductive metal. A method for reversibly storing hydrogen includes providing a storage tank and in situ chemically forming a composite material by charging a mixture of a metal amide and a metal hydride to the storage tank and chemically reacting the mixture at a reaction condition to form a thermally conducting composite material including a metal hydride and a substantially unreactive elemental metal framework. Hydrogen is absorbed into the composite material and is desorbed from the composite material.

19 Claims, 2 Drawing Sheets

(56) References Cited

U.S. PATENT DOCUMENTS

| | | |
|---|---|---|
| 2001/0014309 A1 | 8/2001 | Zaluska et al. |
| 2001/0018939 A1 | 9/2001 | Zaluska et al. |
| 2001/0051130 A1 | 12/2001 | Jensen et al. |
| 2003/0053948 A1 | 3/2003 | Bogdanovic et al. |
| 2003/0129126 A1 | 7/2003 | Chen et al. |
| 2003/0143154 A1 | 7/2003 | Gross et al. |
| 2004/0247521 A1 | 12/2004 | Bogdanovic et al. |
| 2004/0265222 A1 | 12/2004 | Meisner et al. |
| 2005/0013770 A1 | 1/2005 | Schulz et al. |
| 2005/0032641 A1 | 2/2005 | Zidan et al. |
| 2005/0054525 A1 | 3/2005 | Ovshinsky et al. |
| 2006/0081483 A1* | 4/2006 | Chen et al. .................. 206/0.7 |
| 2007/0025908 A1 | 2/2007 | Sandrock et al. |
| 2007/0231254 A1 | 10/2007 | Gross |

OTHER PUBLICATIONS

Lu "Light metal Alanates and amides for reversible hydrogen storage Applications", Department of Metallurgical Engineering at the University of Utah, Dec. 2008, pp. 126-129.*

Li et al., "Hydrogen Storage in Metal—Organic Frameworks by Bridged Hydrogen Spillover", JACS Communications, 2006, 128, pp. 8136-8137.

lyakutti et al., "Aluminum hydride coated single-walled carbon nanotube as a hydrogen storage medium", International Journal of Hydrogen Energy, 34, 2009, pp. 370-375.

Xiong et al., "Thermodynamic and kinetic investigations of the hydrogen storage in the Li—Mg—N—H system", Journal of Alloys and Compounds, 398, 2005, pp. 235-239.

Velikokhatnyi et al., "Energetics of the lithium-magnesium imide-magnesium amide and lithium hydride reaction for hydrogen storage: An ab initio study", Materials Science and Engineering B, 140, 2007, pp. 114-122.

* cited by examiner

METHOD OF ENHANCING THERMAL CONDUCTIVITY IN HYDROGEN STORAGE SYSTEMS

CROSS-REFERENCE TO RELATED APPLICATIONS

This application is a continuation of U.S. application Ser. No. 12/780,445 filed May 14, 2010, now U.S. Pat. No. 8,418, 841 B2, the disclosure of which is incorporated in its entirety by reference herein.

TECHNICAL FIELD

One or more embodiments of the invention relates to materials for reversible hydrogen storage systems.

BACKGROUND

Some conventional systems use hydrogen as a fuel source for energy, and potentially as a replacement for petroleum, other non-renewable fuels, or other sources of alternative energy. Hydrogen may be useful in mobile applications such as vehicles, where it may be stored on the vehicle for use with a fuel cell. The hydrogen may be stored in physical or chemical form. The physical form of storage includes hydrogen liquification or compression, which may be energy intensive processes themselves. The chemical form of storage includes storing hydrogen in metal hydrides, ammonia, carbohydrates, and others as is known in the art.

Reversible systems for chemical storage often utilize a complex hydride or sorbent compound as the storage medium. Hydrogen storage typically occurs via an exothermic absorption (uptake) reaction and an endothermic desorption reaction from the medium. Heat management and control over heat transfer and temperatures may impact the lifetime, efficiency, storage capability, or the like of the hydrogen storage medium. For example, failure to supply or remove sufficient heat from the storage system may result in degradation of vehicle performance (e.g., insufficient hydrogen available to power the fuel cell) or excessively long refill times.

SUMMARY

An embodiment discloses a method of forming a material for reversible hydrogen storage within a storage tank. The method includes charging a mixture of a metal amide and a metal hydride to the storage tank. The mixture is chemically reacted at a reaction condition within the storage tank to form a thermally conducting composite material situated in the storage tank and for reversibly storing hydrogen. The composite material includes a three-dimensional and interconnected framework including a conductive metal.

Another embodiment discloses a method of forming a material for reversible hydrogen storage within a storage tank. A mixture of a metal amide and a metal hydride is charged to the storage tank. The mixture is chemically reacted at a reaction condition within the storage tank to form in situ a thermally conducting composite material for reversibly storing hydrogen. The composite material includes a three-dimensional and interconnected framework including a conductive, elemental metal.

Yet another embodiment discloses a method for reversibly storing hydrogen. A storage tank is provided for reversibly storing hydrogen. A composite material is in situ chemically formed within the storage tank by charging a mixture of a metal amide and a metal hydride to the storage tank and chemically reacting the mixture at a reaction condition within the storage tank to form a thermally conducting composite material including a metal hydride and a substantially unreactive elemental metal framework. Hydrogen is absorbed into the composite material situated within the storage tank. Hydrogen is desorbed from the composite material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Heat management, or the ability to insert and/or extract heat, may impact the rate at which hydrogen can be absorbed and/or released from a hydrogen storage system. For mobile storage applications, such as for supplying hydrogen to a fuel cell on-board a fuel-cell vehicle, the demands placed upon the heat management system may be significant for "reversible" solid-state storage systems.

Reversible systems may utilize a complex hydride or sorbent compound as the storage medium. Hydrogen storage occurs via absorption (uptake) and desorption reactions from the storage medium. Hydrogen uptake occurs through application of pressurized hydrogen and proceeds via an exothermic reaction in which heat is liberated. Conversely, the hydrogen desorption, or release, reaction is endothermic and heat may be applied to the storage system to trigger the desorption process. Heat management of the storage medium is therefore needed during the absorption and desorption processes due to the energy transfers associated with the processes.

Figure 1:
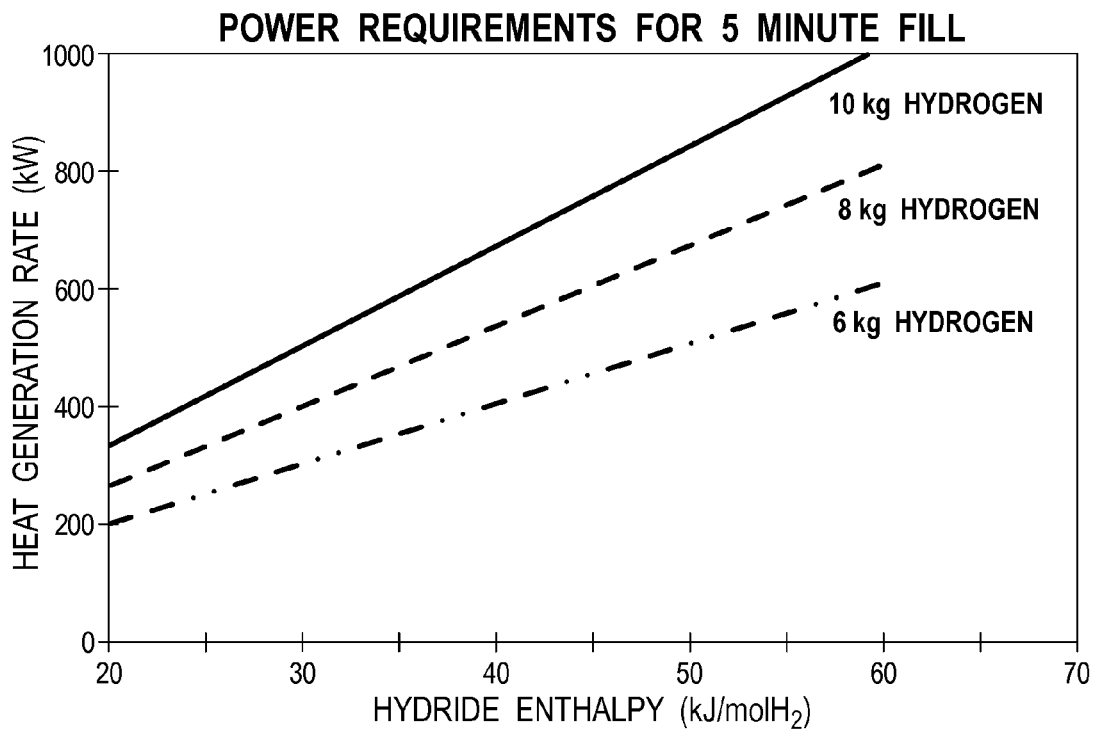
FIG. 1 is a graph showing cooling requirements for a five minute hydrogen refilling as a function of enthalpy of the storage reaction.

FIG. 1 illustrates the cooling requirements for an embodiment of a five minute hydrogen refill event as a function of hydrogen quantity (6, 8, and 10 kg) and reaction enthalpy, $\Delta H_f$ (20-60 kJ/molH$_2$). During refill, hydrogen is absorbed into the storage medium in an exothermic process, and the system requires cooling due to the heat released during the process. The enthalpy, $\Delta H_f$, represents the amount of heat released in kJ per mol of H$_2$ stored. As shown in FIG. 1, cooling is needed for reactions across the enthalpy range, including the low end. For example, a reaction with $\Delta H_f$=20 kJ/molH$_2$ would yield a cooling requirement of ~200 kW.

Most hydrides are inherently poor thermal conductors, and commonly have a thermal conductivity of below 1 W/m·K.

Additionally, many hydrides have a powdered morphology, which may additionally degrade the thermal conductivity due to the presence of voids between the individual particles comprising the powder. In some embodiments, the particles may be nanoscale.

By increasing the thermal conductivity of the hydride, heat management of the storage medium may be facilitated. A known conventional method for increasing the thermal conductivity of hydrides involves mechanical mixing the hydride with better thermal conductors, often metallic, such as aluminum or copper. To obtain higher thermal conductivity, the Al or Cu may form a highly conductive three-dimensional mesh within the hydride material itself, which acts to transport heat to and from a heat-exchanging manifold built into the storage system. The mesh is often modeled as a lattice and large mass fractions (20 to 50 wt. % to example range for larger mass fractions) of metal are necessary to ensure that sufficient conductivity is attained.

However, the metallic additions to the storage medium used to increase the thermal conductivity also have the effect of degrading the gravimetric and volumetric hydrogen density of the storage system, as the metals occupy space within the storage system which could otherwise hold hydrogen storage materials. This creates a balance between a high thermal conductivity of a storage medium and the hydrogen storage capability. Moreover, it may be challenging to evenly distribute and ensure intimate contact between the hydride and conductive material.

In conventional system, complex hydrides, such as $NaAlH_4$, and complex hydride composites, such as the combination between $LiNH_2$ and $MgH_2$, may reversibly absorb and desorb five to six wt. % of hydrogen at the fuel cell working temperature range ($-20°$ C. to $90°$ C.) through the following chemical reactions (1) and (2), respectively:

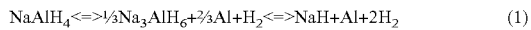

$$NaAlH_4 <=> \tfrac{1}{3}Na_3AlH_6 + \tfrac{2}{3}Al + H_2 <=> NaH + Al + 2H_2 \quad (1)$$

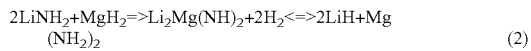

$$2LiNH_2 + MgH_2 => Li_2Mg(NH)_2 + 2H_2 <=> 2LiH + Mg(NH_2)_2 \quad (2)$$

However, the thermal conductivities of these materials are intrinsically low.

Thermal conductivity may be enhanced in a materials-based hydrogen storage system by forming a thermally conductive microstructure in situ, i.e., "in place" or in the reaction mixture, as a by-product from an initial hydrogen storage reaction. Chemical reactions form the improved thermally conductive materials, e.g. metals, transition metals, Al, or the like, in situ while maintaining a medium for the absorption and desorption of hydrogen. In one embodiment, a system of $Li_3AlH_6$ and $Mg(NH_2)_2$ forms a nanocomposite structure when hydrogen desorbs through unidirectional reaction (3) below. During desorption, aluminum is formed, which may be in a three-dimensional framework with the hydride in the composite material:

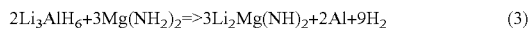

$$2Li_3AlH_6 + 3Mg(NH_2)_2 => 3Li_2Mg(NH)_2 + 2Al + 9H_2 \quad (3)$$

The reactants may be placed directly into the container or hydrogen storage tank before reaction. Of course, other complex metal hydrides and amide combinations are also anticipated.

Subsequent to reaction (3), reversible hydrogen absorption and desorption processes may occur, for example, during hydrogen storage and release processes in a hydrogen storage system. As shown in reaction (4), the in situ formed metal, aluminum, does not participate in further hydrogenation and desorption reactions, remaining essentially unreactive to the hydrogen. The aluminum may remain 95% unreactive through approximately 2000 hydrogen absorption and desorption cycles. The in situ formed aluminum in reactions (3) and (4) may be engineered into a three-dimensional interconnected framework, thereby improving the intrinsic thermal conductivity of the nanostructured complex hydride hydrogen storage composites, or materials. The reversible reaction for hydrogen storage is shown below in reaction (4):

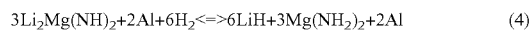

$$3Li_2Mg(NH)_2 + 2Al + 6H_2 <=> 6LiH + 3Mg(NH_2)_2 + 2Al \quad (4)$$

The amount of aluminum in the composite hydrogen storage material may be adjusted or increased by further incorporating $AlH_3$, $LiAlH_4$, or the like in the materials preparation process, for example in reaction (3). The $AlH_3$ or $LiAlH_4$ will decompose upon the initial hydrogen desorption (reaction (3)) to increase the amount of aluminum present in the composite material used for hydrogen storage (see reaction (4)).

Reaction conditions for reactions (3) include heating the starting mixtures to a temperature from $50°$ C. to $250°$ C. in hydrogen or inert (such as Ar) atmosphere. Reaction (4) may occur from $30°$ C. to $250°$ C. in a hydrogen atmosphere from 1 bar to 200 bar.

The concept of engineering a three-dimensional conductive framework in situ through the materials design and processing may be extended into other nanostructured hydride materials that reversibly absorb and desorb hydrogen and require effective heat management to realize fast charging and discharging.

In conventional metal hydrides, such as those in reactions (1) and (2), the hydrogen desorption and absorption reactions involve the hydrogen molecule dissociation or recombination on the surface of the metal hydride particles, and the hydrogen atom diffusion into and out of the metal hydride crystal lattice structure. The intrinsic hydrogen kinetics is not limited by the size of the particles.

With high capacity hydrogen storage materials, including reversible complex hydride composites, hydrogen desorption and absorption within the composites involves the mass transfer of both hydrogen and other constituting elements, which may include metals. Therefore, the nanostructured materials are used to initiate or start the chemical reaction, as well as to improve the chemical reaction kinetics (i.e. with a shorter diffusion distance). Typically, these reactions are facilitated using a catalyst, which also requires a nanostructured morphology in order to distribute the catalyst homogeneously and have a high contact surface between catalysts and the complex hydrides. Materials processing and procedures may be used to decrease particle size and homogenize a mixture or powder and includes high energy mechanical (or ball) milling for example, as well as other techniques as are known in the art.

These nanostructured composite materials may pose challenges with heat management relating to hydrogen absorption and desorption for several reasons including: phase boundaries and nano-voids formed between nanoparticles; poor thermal conductivity of complex hydrides; and engineering difficulties with mechanically mixing higher thermal conductive materials to form a mesh structure with the conductive particles and the hydrogen storage particles. In addition, the tradeoff exists between higher conductivity with higher amount of conductive materials, and the amount of hydrogen the composite material may absorb.

Figure 2:
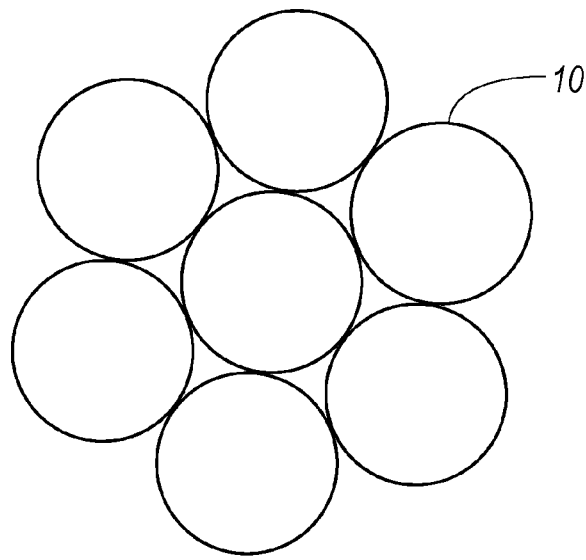
FIG. 2 is a representation of a two-dimensional packing density model.

In one embodiment, a three dimensional framework is formed in situ, as in reaction (3). The framework may be a percolative porous material and be connected in a random manner. A simple two dimensional model of packing fractions and densities representing a porous material is shown in FIG. 2 with circles 10 representing idealized composite particles. Actual composite materials may be more irregular in morphology. A theoretical maximum packing density is calculated based on a close packed system. The particles are modeled as circles for two-dimensional calculations and spheres for three-dimensional calculations for simplification. The maximum packing density of a two-dimensional system of circles 10 (as represented in FIG. 2) is ninety-one volume percent. The maximum packing density of a three-dimensional system of spheres is seventy-four volume percent.

Therefore, a thermal conductive framework may form if the volume fraction of a high thermally conductive material is between approximately 9 and 26 vol. %, or the percentage of void in a two-dimensional and three-dimensional close packed system. The lower threshold, 9 vol. %, is set such that the highly conductive material would largely fill the voids in the close packed system, thus interconnecting the composite materials in a two-dimensional conductive network. By increasing the volume fraction to above 9 vol. %, the thermal network would be able to extend into the third dimension, and provide a conductive network throughout the composite material.

For example, using the embodiment above in reactions (3) and (4), the three-dimensional nanosized thermally conductive framework may be formed in situ if the vol. % of aluminum is between the void vol. % in the close packed system. Reaction (3) has a 6.4 wt. % of $H_2$, and reaction (4) has a 4.4 wt. % of $H_2$. If the density of Al is 2.7 g/cc, and the density of $Li_2Mg(NH)_2$ is 1.76 g/cc, the theoretical volume fraction of the aluminum in reversible reaction (4) can be calculated as approximately fifteen vol. % Al in the composite, which is within the range of 9-26 vol. % for a percolating network to form.

Figure 3:
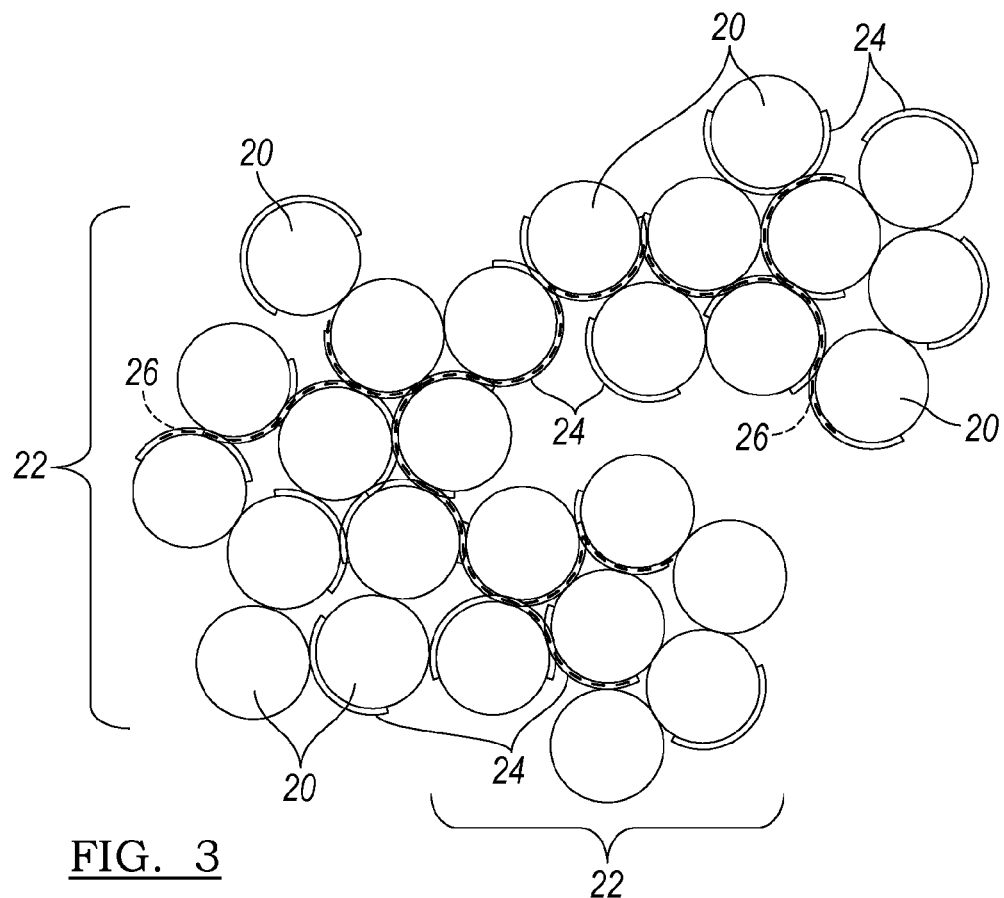
FIG. 3 is a representation of the microstructure of the composite material taken in a two-dimensional system.

FIG. 3 represents an embodiment of the morphology of that may be expected from reaction (3) for example. The composite materials, primarily made of the hydrogen storage material, are nanoparticles 20 on the order of approximately 0.3-250 nm in scale. These nanoparticles 20 may agglomerate, or simply group together to form clusters 22 of particles. The clusters 22 may be nano or micro-scale, potentially ranging from several hundred nanometers to tens of microns and up to approximately 100 microns in scale. The aluminum forms films 24 which partially cover the surface of the composite particles 20, these films have length scale on the order of tens of nanometers, and may in some instances be only a few nanometers in thickness. There may be more than one film 24 structure on each particle 20. The films 24 on adjacent particles 20 may connect to one another, thereby forming a conductive pathway 26 for heat transfer.

The films 24 act to bridge the voids formed between the particles 20 and clusters 22 to provide thermal linking This is based on a randomization, or percolation theory, because in actuality no two particles or films are exactly alike. Therefore a tortured, or percolated, pathway may form between composite particles 20 by the interconnected films 24, extend to form pathways between composite clusters 22, and create a three-dimensional framework extending within the hydrogen storage material. Pockets of volume within the hydrogen storage material may form without the thermal conductive framework, however the framework in the remaining material may provide a thermally conductive pathway circumventing any pockets.

Figure 4:
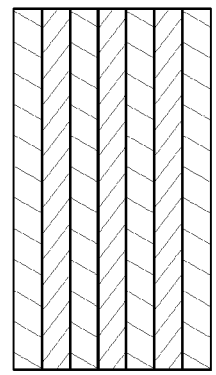
FIG. 4 is a representation of a parallel model for the conductivity of the composite material and conductive framework.
Figure 5:
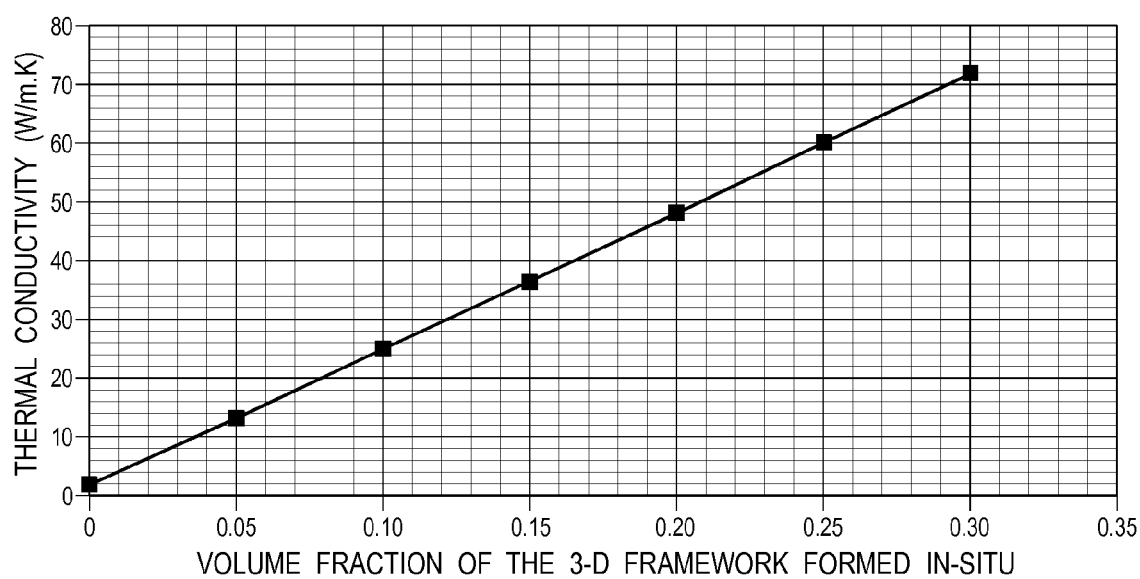
FIG. 5 is a graph showing the thermal conductivity of a composite hydride as a function of the volume fraction of the conductive framework.

FIGS. 4 and 5 provide a model for the thermal conductivity of the composites material with a conductive framework according to an embodiment. A parallel model, as shown in FIG. 4, may be used to calculate the thermal conductivities of the composite hydride hydrogen storage materials having two phases with a high thermal conductivity three-dimensional framework formed in situ. The volume fraction of high thermal conductivity materials is assumed to be ø, and the volume fraction of the low thermal conductivity hydrogen storage materials is therefore (1−ø) in a two phase model. The thermal conductivity, λ, of the composite is then defined as:

$$\lambda = \lambda_h \varnothing + \lambda_{ch}(1-\varnothing) \quad (5)$$

where $\lambda_h$ is the thermal conductivity of the higher conductivity materials, and $\lambda_{ch}$ is that of lower thermal conductivity complex hydrides. For example, the thermal conductivity of aluminum is $\lambda_h$=237 W/m·K, and that for complex hydrides is about $\lambda_{ch}$=1 W/m·K. The thermal conductivity of the nanostructured complex hydrides varies with the volume fraction of the in situ formed 3D thermal conductive framework as shown in FIG. 5.

For example, using reactions (3) and (4), a volume fraction of about fifteen vol. % of aluminum (Al) is formed in situ during materials processing. This volume fraction falls into the range of approximately 9 and 26 vol. % where a three-dimensional high thermal conductivity framework may be formed. The thermal conductivity of the nanostructured complex hydride composites with fifteen vol. % in situ formed aluminum three-dimensional framework is approximately thirty-six W/m·K. The thermal conductivity of a complex hydride composite without the aluminum framework is approximately one W/m·K. Thus, by incorporating a three-dimensional conductive framework within a complex hydride composite, the thermal conductivity and heat management of the hydrogen storage medium is improved, and the intrinsic hydrogenation and desorption kinetics of the storage material is maintained.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of forming a material for reversible hydrogen storage within a storage tank, the method comprising:
    charging a mixture of a metal amide and a metal hydride to the storage tank; and
    chemically reacting the mixture at a reaction condition within the storage tank to form a thermally conducting composite material situated in the storage tank and for reversibly storing hydrogen, the composite material including a three-dimensional and interconnected framework including a conductive metal.

2. The method of claim 1 wherein after the reacting step, the conductive metal is substantially unreactive during subsequent hydrogen absorption and desorption reactions.

3. The method of claim 1 wherein the volume fraction of the conductive metal is between nine and twenty-six percent by volume of the composite material.

4. The method of claim 1 wherein the metal amide is $Mg(NH_2)_2$.

5. The method of claim 1 wherein the metal hydride is $Li_3AlH_6$.

6. The method of claim 1 wherein the composite material is $Li_2Mg(NH)_2$.

7. The method of claim 1 wherein the conductive metal is Al.

8. The method of claim 7 wherein the chemical reaction further includes $AlH_3$ to adjust the amount of aluminum formed.

9. The method of claim 1 wherein the conductive metal is elemental metal.

10. The method of claim 9 wherein the conductive elemental metal is non-catalytic.

11. A method for reversibly storing hydrogen, the method comprising:
provided a storage tank for reversibly storing hydrogen;
absorbing hydrogen into a composite material situated within the storage tank and formed by the method of claim 1, the composite material including a metal hydride and a substantially unreactive conductive metal framework; and
desorbing hydrogen from the composite material including maintaining the substantially unreactive conductive metal framework.

12. The method of claim 11 further comprising transferring heat along the composite material using the conductive metal framework.

13. The method of claim 11 wherein the hydrogen absorption and desorption are characterized by the chemical reaction: $3Li_2Mg(NH)_2 + 2Al + 6H_2 \Longleftrightarrow 6LiH + 3Mg(NH_2)_2 + 2Al$.

14. The method of claim 11 wherein the substantially unreactive conductive metal framework is elemental metal.

15. The method of claim 1 wherein chemically reacting the mixture at the reaction condition within the storage tank to form the thermally conducting composite material further comprises forming the composite material into agglomerated nanocomposites having voids therebetween and forming the conductive elemental metal into a number of thermally conductive bridges through the voids to thermally link the agglomerated nanocomposites.

16. A method of forming a material for reversible hydrogen storage within a storage tank, the method comprising:
charging a mixture of a metal amide and a metal hydride to the storage tank; and
chemically reacting the mixture at a reaction condition within the storage tank to form in situ a thermally conducting composite material for reversibly storing hydrogen, the composite material including a three-dimensional and interconnected framework including a conductive, substantially unreactive, elemental metal.

17. The method of claim 16 wherein chemically reacting the mixture to form in situ the thermally conducting composite material further comprises forming the interconnected framework including the conductive, elemental metal as a number of nanostructured thermally conductive bridges.

18. A method for reversibly storing hydrogen, the method comprising:
providing a storage tank for reversibly storing hydrogen;
in situ chemically forming a composite material within the storage tank by charging a mixture of a metal amide and a metal hydride to the storage tank and chemically reacting the mixture at a reaction condition within the storage tank to form a thermally conducting composite material including a metal hydride and a substantially unreactive elemental metal framework;
absorbing hydrogen into the composite material situated within the storage tank; and
desorbing hydrogen from the composite material.

19. The method of claim 18 wherein in situ chemically forming the composite material within the storage tank to form a thermally conducting composite material further comprises forming the composite material into agglomerated nanocomposites having voids therebetween and forming the elemental metal framework as a number of thermally conductive bridges through the voids to thermally link the agglomerated nanocomposites.

* * * * *